United States Patent
Osborne et al.

(10) Patent No.: US 6,761,390 B1
(45) Date of Patent: Jul. 13, 2004

(54) GOLF CART FOOTREST

(76) Inventors: Matt H. Osborne, 214 Emerson Ave., Ypsilanti, MI (US) 48198-4252; Betty L. Osborne, 214 Emerson Ave., Ypsilanti, MI (US) 48198-4252

( * ) Notice: Subject to any disclaimer, the term of this patent is extended or adjusted under 35 U.S.C. 154(b) by 0 days.

(21) Appl. No.: 10/413,725

(22) Filed: Apr. 15, 2003

(51) Int. Cl.$^7$ .................................................. B60N 3/06
(52) U.S. Cl. .......................................... 296/75; 296/71
(58) Field of Search ............................... 296/75, 146.9, 296/3, 77.1, 193.02, 79, 83, 70, 71; 293/143, 144; 280/748, 751, 752, DIG. 5, 291

(56) References Cited

U.S. PATENT DOCUMENTS

| | | | | |
|---|---|---|---|---|
| 2,020,459 A | * | 11/1935 | Daniele | 296/75 |
| 2,635,678 A | * | 4/1953 | Basil | 297/146 |
| 2,798,737 A | * | 7/1957 | Sundlof | 280/748 |
| 3,438,667 A | * | 4/1969 | Davis | 293/115 |
| 4,310,193 A | * | 1/1982 | Kolleas | 296/75 |
| 4,709,943 A | * | 12/1987 | Yoshimura et al. | 280/751 |
| 4,728,121 A | * | 3/1988 | Graves | 280/748 |
| 5,277,465 A | * | 1/1994 | Weir | 293/142 |
| 5,499,844 A | * | 3/1996 | Dirck | 280/748 |

* cited by examiner

Primary Examiner—D. Glenn Dayoan
Assistant Examiner—Patricia L. Engle

(57) ABSTRACT

A golf cart footrest including horizontal footrest bars mounted between two steel endplates, which are attached to steel golf cart mounting brackets. The mounting brackets can be mounted through existing holes in the canopy frame of a golf cart or appropriate holes can be drilled in the golf cart's side panels to position the footrest just above the dashboard. There are a series of perforated holes in the endplates that can be aligned with attaching holes in the mounting brackets in order to adjust the height of the footrest or to better align it with existing mounting holes in the golf cart. To install the golf cart footrest simply requires an individual to bolt the mounting brackets with attached endplates to existing holes in a golf cart's frontal canopy frame. If necessary holes do not exist, then appropriate holes can be drilled in the golf cart's frame or side panels. The horizontal footrest bars are then bolted between the two endplates and protective end caps are installed over the bolt heads.

16 Claims, 3 Drawing Sheets

GOLF CART FOOTREST

BACKGROUND OF THE INVENTION

1. Field of the Invention

The present invention relates to a footrest for use in connection with a golf cart. The golf cart footrest has particular utility in connection with protecting the trim, paint, and dashboard of a golf cart.

2. Description of the Prior Art

Golfers seem to like to rest their feet on the dashboard or other finished surfaces inside golf carts. The cleats from the golfer's shoes can do considerable damage to the carts dashboard, trim, and other painted surfaces. It would be desirable to have a footrest in the golf cart, conveniently positioned for the golfer to rest his/her feet, thereby protecting the golf cart's interior.

The use of footrests in vehicles is known in the prior art. For example, U.S. Pat. No. 6,174,018 to Mikulski discloses an off-road vehicle footrest for use with vehicles that have an open doorway or removable door. The footrest mounts to the vehicle's unused door hinges and has a sloped surface with angularly spaced abutment surfaces for resting the driver's unused foot or a passenger's feet. However, the footrest of the Mikulski '018 patent is different in structure from that of the present invention and does not disclose convenient footrest bars that extend across the width of a vehicle, such as a golf cart, just above the dashboard for propping up and resting the feet without damaging the cart.

U.S. Pat. No. 4,310,193 to Kolleas discloses an adjustable footrest for mounting on either side of a vehicle. The sloped footrest can be inserted in one of several slots, attached to side panels below the dashboard of a vehicle, for adjusting the height of the footrest. However, the footrest disclosed in the Kolleas '193 patent is different in structure from that of the present invention and does not disclose convenient footrest bars that extend across the width of a vehicle, such as a golf cart, just above the dashboard for propping up and resting the feet without damaging the cart.

Similarly, U.S. Pat. No. 3,047,088 to Murrell discloses a footrest that can be mounted in the floorboard of a vehicle for the driver to rest his/her foot that is not on the accelerator. The footrest is slightly wider than a foot and has two sloped surfaces for supporting the bottom of the shoe and the heel. However, the footrest disclosed in the Murrell '088 patent is different in structure from that of the present invention and does not disclose convenient footrest bars that extend across the width of a vehicle, such as a golf cart, just above the dashboard for propping up and resting the feet without damaging the cart.

Lastly, U.S. Pat. No. 6,102,466 to Kanazawa et al., U.S. Pat. No. 2,380,118 to Martz, U.S. Pat. No. 2,341,080 to Burkholder, and D451,292 to Cheris et al. discloses apparatus that may be of general interest and pertinent to the construction and design of the present invention. The Kanazawa '466 patent discloses a structure of a vehicle body that includes a footrest support plate located between the dashboard and floorboard. The Martz '118 patent discloses individual footrests that are mounted on each bottom side of the firewall in a vehicle for resting the feet on long trips. The Burkholder '080 patent discloses a footrest that has at least two platforms at different heights primarily for the use by short legged people to support their feet and lets while sitting in a seat. Finally, the Cheris '292 patent discloses the design of a footrest that has a sloping plane with horizontal strips located every few inches in the vertical direction for supporting the feet of a seated person. However, these patents as with the above patents all disclose apparatus that is different in structure from that of the present invention and none disclose convenient footrest bars that extend across the width of a vehicle, such as a golf cart, just above the dashboard for propping up and resting the feet without damaging the cart.

While the above-described devices fulfill their respective, particular objectives and requirements, the aforementioned patents do not describe a golf cart footrest that allows a golfer to prop his feet up inside a golf cart, in order to rest his/her feet and legs while riding in the cart, without damaging the cart.

Therefore, a need exists for a new and improved golf cart footrest that can be used for resting a golfers feet and legs while riding in a golf cart. In this regard, the present invention substantially fulfills this need. In this respect, the golf cart footrest according to the present invention substantially departs from the conventional concepts and designs of the prior art, and in doing so provides an apparatus primarily developed for the purpose of propping up and resting the feet and legs without damaging the cart.

SUMMARY OF THE INVENTION

In view of the foregoing disadvantages inherent in the known types of vehicle footrest now present in the prior art, the present invention provides an improved golf cart footrest, and overcomes the above-mentioned disadvantages and drawbacks of the prior art As such, the general purpose of the present invention, which will be described subsequently in greater detail, is to provide a new and improved golf cart footrest which has all the advantages of the prior art mentioned heretofore and other novel features that result in a vehicle footrest that is not anticipated, rendered obvious, suggested, or even implied by the prior art, either alone or in any combination thereof.

Golfers like to rest there feet on the dashboard of a golf cart. However, over time the cleats on their shoes can damage the expensive interior of the golf cart, such as dashboard, painted surfaces, and trim. The golf cart footrest of the present invention mounts just above the dashboard and provides a convenient and comfortable place to rest the golfer's feet while riding in a cart. The footrest can be provide on new golf carts or sold as an aftermarket accessory for existing golf carts.

To attain this, the present invention essentially comprises horizontal footrest bars mounted between two steel endplates, which are attached to steel golf cart mounting brackets. The mounting brackets can be mounted through existing holes in the canopy frame of a golf cart or appropriate holes can be drilled in the golf cart's side panels to position the footrest just above the dashboard. There are a series of perforated holes in the endplates that can be aligned with attaching holes in the mounting brackets in order to adjust the height of the footrest or to better align with existing mounting holes in the golf cart. Optionally, the footrest assembly could be mounted to the top of the dashboard. Typically, the golf cart footrest will have two horizontal bars, approximately 41-inches long, which are separated vertically by about 8-inches.

To install the golf cart footrest would simply require an individual to bolt the mounting brackets with attached endplates to existing holes in a golf cart's frontal canopy frame. If necessary holes do not exist, then appropriate holes can be drilled in the golf cart's frame or side panels. The horizontal footrest bars are then bolted between the two endplates.

There has thus been outlined, rather broadly, the more important features of the invention in order that the detailed description thereof that follows may be better understood and in order that the present contribution to the art may be better appreciated.

There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved golf cart footrest that provides in the apparatuses and methods of the prior art some of the advantages thereof, while simultaneously overcoming some of the disadvantages normally associated therewith.

It is another object of the present invention to provide a new and improved golf cart footrest that may be easily and efficiently manufactured and marketed.

It is yet another object of the present invention to provide a new and improved golf cart footrest that has a low cost of manufacture with regard to both materials and labor, and which accordingly is then susceptible of low prices of sale to the consuming public, thereby making such devices economically available to the buying public.

An even further object of the present invention is to provide a new and improved golf cart footrest that can easily be installed by an individual on an existing golf cart.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
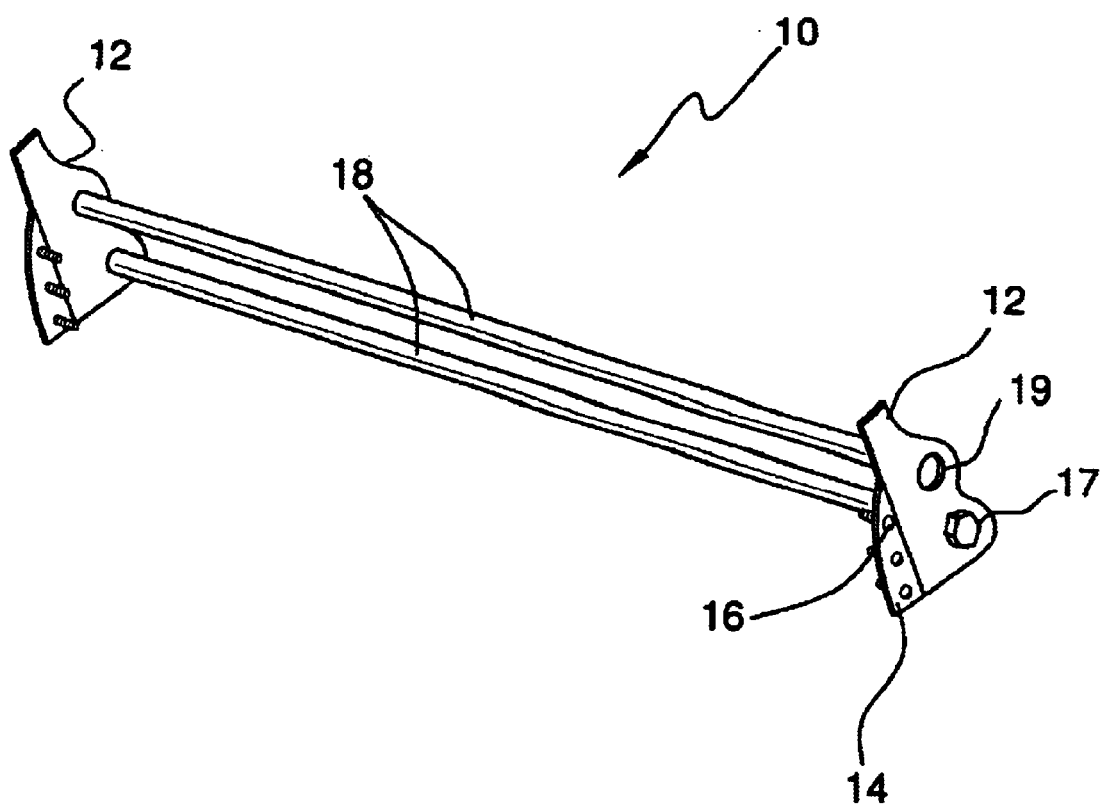
FIG. 1 is a perspective view of the preferred embodiment of the golf cart footrest constructed in accordance with the principles of the present invention.

Referring now to the drawings, and particularly to FIGS. 1–4, a preferred embodiment of the golf cart footrest of the present invention is shown and generally designated by the reference numeral 10.

In FIG. 1, a new and improved golf cart footrest 10 of the present invention for the purpose of resting a golfers feet and legs, while riding hi a golf cart 24, without damaging the cart's surfaces with golf shoe cleats is shown and described. More particularly, the golf cart footrest 10 has one or more horizontal footrest bars 18 mounted between two steel endplates 12 by bolt means, which are attached to steel mounting brackets 14 with holes 16 provided for mounting the footrest to a golf cart. Threaded bolts 17 (only one shown) are inserted through endplate mounting holes 19 and screwed into the horizontal footrest bars 18.

Figure 2:
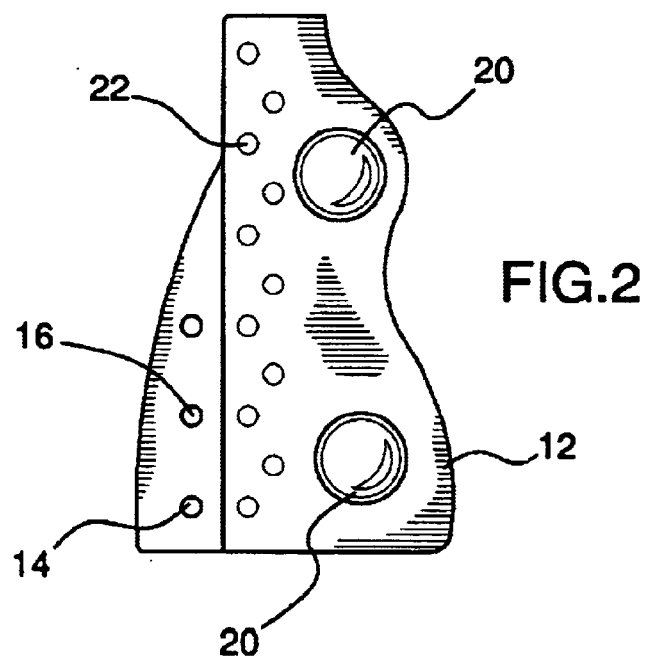
FIG. 2 is a side view of an endplate with attached mounting bracket for the golf cart footrest of the present invention.

FIG. 2 is a side view of an endplate 12 with attached mounting bracket 14 for the golf cart footrest of the present invention. Protective end caps 20 are provide over the bolt heads that hold the horizontal footrest bars 18 to the endplates 12. There are a series of perforated holes 22 in the endplates 12 that can be aligned with attaching holes in the mounting brackets 14 in order to adjust the height of the footrest 10 or to better align it with existing mounting holes in the golf cart.

Figure 3:
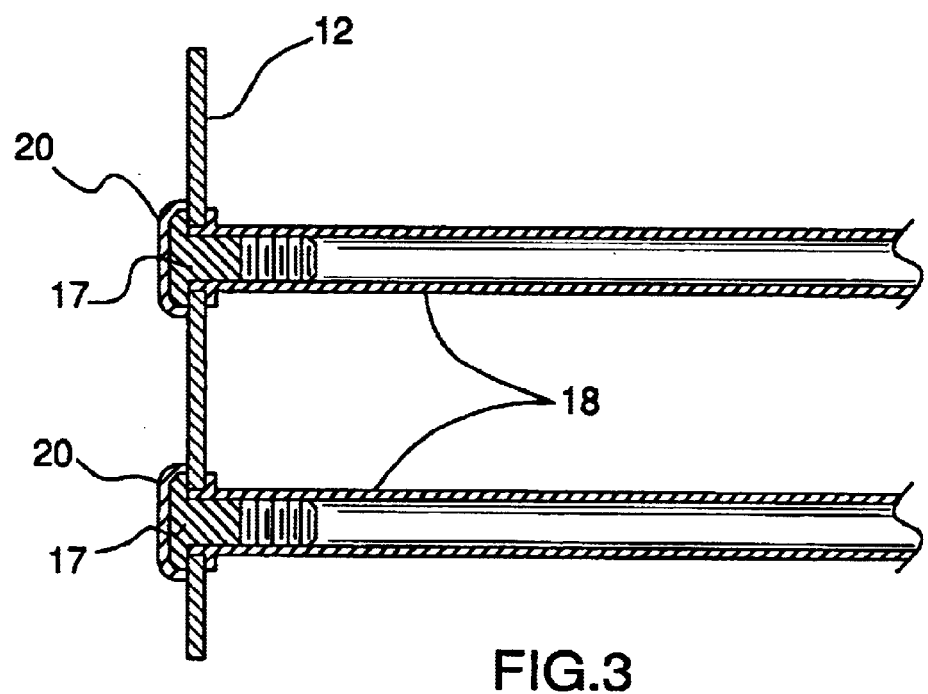
FIG. 3 is a front cross-sectional view showing the horizontal bars of the golf cart footrest of the present invention.

FIG. 3 is a front cross-sectional view showing the horizontal bars of the golf cart footrest of the present invention. This shows two horizontal footrest bars 18 mounted at one end to an endplate 12, typically by means of threaded bolts 17 inserted through endplate mounting holes 19 and threaded into the ends of the horizontal footrest bars. Finally, protective end caps 20 are placed over the exposed bolt heads.

Figure 4:
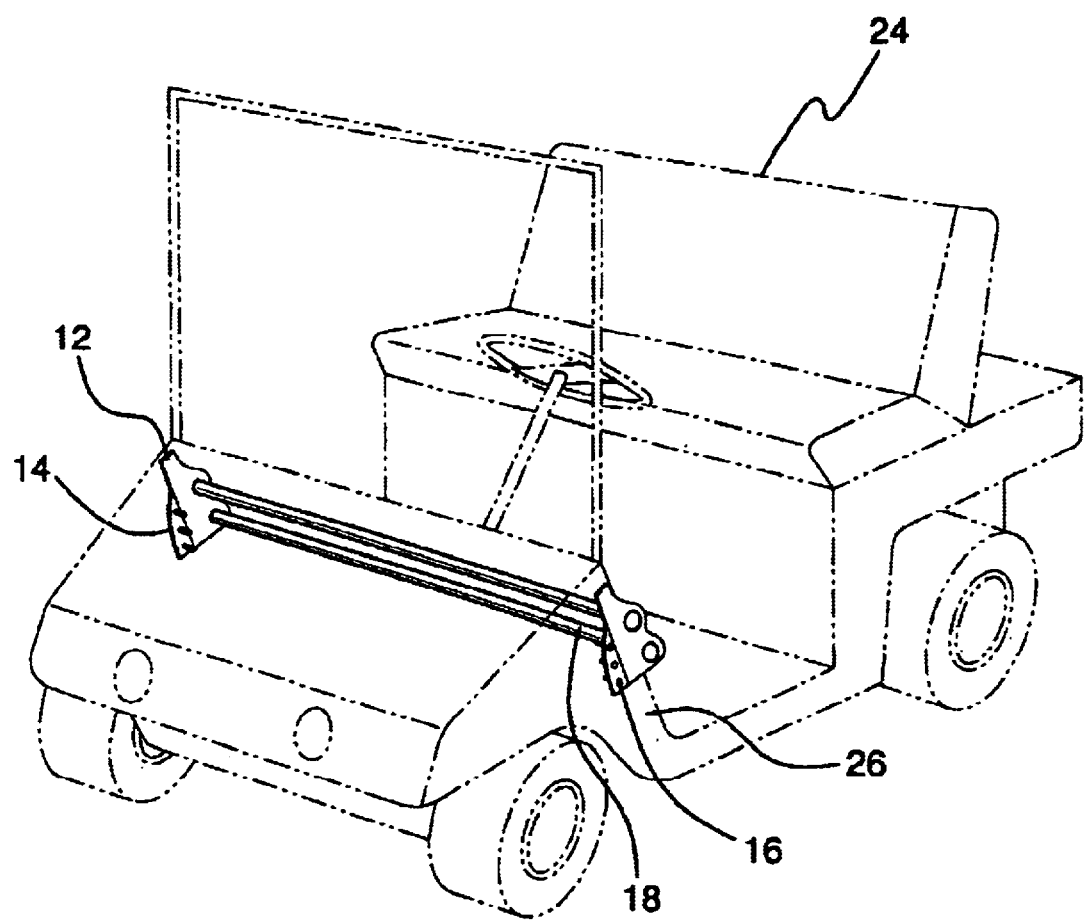
FIG. 4 is a perspective view of a golf cart with the mounted footrest of the present invention.

Finally, FIG. 4 is a perspective view a golf cart with the mounted golf cart footrest of the present invention. The mounting brackets 14 can be bolted through existing holes in the front canopy frame of a golf cart or appropriate holes can be drilled in the golf cart's canopy frame 26 or side panels to position the footrest just above the dashboard. Optionally, the footrest assembly could be mounted to the top of the dashboard. Typically, the golf cart footrest will have two horizontal bars 18, approximately 41-inches long, which are separated vertically by about 8-inches.

To install the golf cart footrest 10 simply requires an individual to bolt the mounting brackets 14, with attached endplates 12, to existing holes in a golf cart's frontal canopy frame 26. If necessary holes do not exist, then appropriate holes can be drilled in the golf cart's canopy frame or side panels. The horizontal footrest bars 18 are then bolted between the two endplates 12 and protective end caps 20 are installed.

While a preferred embodiment of the golf cart footrest has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, horizontal footrest bars can be made of any number of strong materials, such as steel, cast iron, wood, and molded polymers. And, various attachment means can be utilized to mount the footrest to any golf cart or similar vehicle.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A golf cart with horizontal footrest, comprising:
   a golf cart, said golf cart fitted with a horizontal footrest, said horizontal footrest further comprising:
   a pair of footrest endplates, said endplates having mounting holes for horizontal footrest bars;
   one or more horizontal footrest bars mounted by attaching means between said footrest endplates through said mounting holes;
   a pair of mounting brackets adjustably attached to said pair of footrest endplates for mounting on a golf cart; and
   a series of vertical height adjusting perforated holes in said footrest endplate for adjusting the height of said footrest relative to a dashboard of said golf cart.

2. The golf cart of claim 1, wherein said endplates and mounting brackets are fabricated out of a metal.

3. The golf cart of claim 1, wherein said horizontal footrest bars are fabricated out of material from the group consisting of: steel, cast iron, wood, and molded polymers.

4. The golf cart of claim 1, said mounted by attaching means of said horizontal footrest bars further comprising threaded bolts placed through said end plate mounting holes and screwed into the end of said horizontal footrest bars.

5. The golf cart of claim 4, wherein protective end caps are placed over the heads of said threaded bolts on the outside of said footrest end plates.

6. The golf cart of claim 1, wherein said mounting brackets are mounted by attaching means through existing mounting holes in the canopy frame of said golf cart.

7. The golf cart of claim 1, wherein said mounting brackets are mounted by drilling holes in the canopy frame of said golf cart to match said mounting holes in said mounting brackets.

8. The golf cart of claim 1, wherein the shape of said horizontal footrest bars is from the group consisting of: cylindrical and rectangular.

9. The golf cart of claim 1, said adjusting the height of said footrest further comprises aligning appropriated said perforated holes of said footrest endplates with available height adjustment holes in said mounting bracket and securing with at least two bolts and nuts on each bracket.

10. The golf cart of claim 1, wherein said footrest is mounted just above said golf cart's dashboard for protecting said golf cart's interior trim.

11. A golf cart with horizontal footrest mounted just above the dashboard for protecting said golf cart's paint and interior trim, comprising:
    a golf cart, said golf cart fitted with a horizontal footrest, said horizontal footrest further comprising;
    a pair of metal footrest endplates, said endplates having mounting holes for horizontal footrest bars;
    one or more horizontal footrest bars mounted by threaded bolt means through said mounting holes in said footrest endplates, said horizontal footrest bars being cylindrical in shape;
    protective end caps placed over the heads of said threaded bolts on the outside of said footrest end plates;
    a pair of metal mounting brackets adjustably attached to said pair of footrest endplates for mounting on a golf cart, said mounting brackets being mounted by attaching means through mounting holes in the canopy frame of said golf cart; and
    a series of vertical height adjusting perforated holes in said footrest endplate for adjusting the height of said footrest relative to a dashboard of said golf cart by aligning appropriated said perforated holes of said footrest endplates with available height adjustment holes in said mounting bracket and securing with at least two bolts and nuts on each bracket.

12. The golf cart of claim 11, wherein said horizontal footrest bars are fabricated out of material from the group consisting of: steel, cast iron, wood, and molded polymers.

13. A golf cart footrest, comprising:
    one or more horizontal footrest bars;
    a pair of metal footrest endplates, said endplates having mounting holes for attaching said horizontal footrest bars, said footrest endplates further having a series of vertical height adjusting perforated holes for adjusting the height of said footrest relative to a dashboard of a golf cart;
    two or more threaded bolts placed through said mounting holes in said endplates and screwed into the end of said horizontal footrest bars for securing said footrest bars to said metal footrest endplates;
    protective end caps placed over the heads of said two or more threaded bolts on the outside of said footrest end plates; and
    a pair of metal mounting brackets adjustably attached to said pair of footrest endplates for mounting on a golf cart.

14. The footrest of claim 13, wherein the shape of said horizontal footrest bars is from the group consisting of: cylindrical and rectangular.

15. The footrest of claim 13, wherein said adjusting the height of said footrest further comprises aligning appropriate said perforated holes of said footrest endplates with available height adjustment holes in said mounting bracket and securing with at least two bolts and nuts on each bracket.

16. The footrest of claim 13, wherein said horizontal footrest bars are fabricated out of material from the group consisting of: steel, cast iron, wood, and molded polymers.

* * * * *